United States Patent [19]

Iritani

[11] Patent Number: 4,792,009
[45] Date of Patent: Dec. 20, 1988

[54] FOUR WHEEL DRIVE VEHICLE

[75] Inventor: Hirofumi Iritani, Sakai, Japan

[73] Assignee: Kubota Ltd., Osaka, Japan

[21] Appl. No.: 113,155

[22] Filed: Oct. 27, 1987

[30] Foreign Application Priority Data

Dec. 22, 1986 [JP] Japan ................................ 61-305976

[51] Int. Cl.⁴ ............................................ B62D 17/34
[52] U.S. Cl. ..................................... 180/233; 180/248
[58] Field of Search ..................... 180/233, 248, 249; 74/745, 740, 665 GA

[56] References Cited

U.S. PATENT DOCUMENTS

| | | | |
|---|---|---|---|
| 4,574,910 | 3/1986 | Miki et al. | 180/249 |
| 4,609,064 | 9/1986 | Suzuki et al. | 180/247 |
| 4,669,559 | 6/1987 | Fukui | 180/6.24 |
| 4,715,467 | 12/1987 | Sakai | 180/247 |

*Primary Examiner*—David M. Mitchell
*Assistant Examiner*—Donn McGiehan
*Attorney, Agent, or Firm*—Cushman, Darby & Cushman

[57] ABSTRACT

A four wheel drive vehicle comprising dirigible front wheels and nondirigible rear wheels. Drive of an engine is transmitted to the front and rear wheels through a propelling drive transmission for producing at least two, high and low, speeds, a front wheel change speed mechanism, and a rear wheel change speed mechanism. The front and rear wheel change speed mechanisms are controlled by a control device to produce a high speed state with the front wheels accelerated when a steering angle of the front wheels exceeds a predetermined angle and the propelling drive transmission is in a low speed position, to produce a low speed state with the front wheels accelerated when the steering angle of the front wheels exceeds the predetermined angle and the propelling drive transmission is in a high speed position, and to produce a standard state in which the front and rear wheels are driven at the same speed when the steering angle of the front wheels is below the predetermined angle.

7 Claims, 4 Drawing Sheets

FOUR WHEEL DRIVE VEHICLE

BACKGROUND OF THE INVENTION (1) Field of the Invention

The present invention relates to a four wheel drive vehicle, particularly an agricultural tractor, comprising a transmission system for driving front wheels at a higher speed than rear wheels to be capable of making a turn with a small turning radius during an operational run.

(2) Description of the Prior Art

A four wheel drive vehicle is disclosed in U.S. Pat. No. 4,669,559, which comprises a front wheel drive line including a front wheel change speed mechanism for producing two, high and low, speeds. When the low speed is selected, a standard speed mode is produced wherein a front wheel speed is equal to a rear wheel speed. When the high speed is selected, a front wheel acceleration mode is produced wherein the front wheel speed is greater than the rear wheels speed.

The term "front wheel speed" used herein refers to a vehicle speed produced by driving the front wheels, and may generally be regarded as a peripheral speed of the front wheels. The same applies to the "rear wheel speed".

To enable this type of vehicle to make a turn with a small turning radius, switching is made for the front wheel acceleration mode in response to a steering angle of the front wheels exceeding a certain angle. A sudden acceleration of the front wheels for making a turn is dangerous when the vehicle is traveling at high speed along a road, for example. The vehicle, therefore, includes check means to prevent the switching for the front wheel acceleration mode when a propelling drive transmission is in a high speed position. This construction allows the front wheel change speed mechanism to function only when the vehicle is traveling at low speed, and does not provide a solution to the problem of how the vehicle may be able to make a turn safely and efficiently when traveling on the road at high speed.

SUMMARY OF THE INVENTION

A primary object of the present invention is to provide a four wheel drive vehicle capable of making a turn safely and efficiently by increasing the front wheel speed over the rear wheel speed even during a high speed run.

In order to achieve the above object, a four wheel drive vehicle according to the present invention comprises an engine, front wheels and rear wheels driven by the engine, the front wheels being dirigible, propelling drive transmission means for producing at least two, high and low, speeds, a front wheel change speed mechanism for receiving power from the propelling drive transmission means and producing a plurality of speeds, the front wheel change speed mechanism including a first switching means for selecting between the plurality of speeds to be produced by the front wheel change speed mechanism, a rear wheel change speed mechanism for receiving power from the propelling drive transmission means and producing a plurality of speeds, the rear wheel change speed mechanism including a second switching means for selecting between the plurality of speeds to be produced by the rear wheel change speed mechanism, and control means for controlling the first and second switching means, for control means receiving information regarding change speed positions of the propelling drive transmission means and steering positions of the front wheels, wherein the control means is operable in response to the change speed positions of the propelling drive transmission means to control the first and second switching means to select a speed mode in which the front wheels are driven faster than the rear wheels when a steering angle of the front wheels exceeds a predetermined angle, and to select a speed mode in which the front wheels and the rear wheels are driven at substantially the same speed when the steering angle of the front wheels is below the predetermined angle.

The four wheel drive vehicle as constructed above is capable of setting appropriate front wheel speed and rear wheel speed in accordance with the traveling speed of the vehicle and with the condition that the front wheel speed is higher than the rear wheel speed. This construction assures a safe and efficient turn to be made even during a high speed run.

In a preferred embodiment of the invention, the front wheel change speed mechanism includes a first transmission mechanism for producing a standard speed, a second transmission mechanism for producing a high speed, and a first switching means for selecting between the first and second transmission mechanisms, while the rear wheel change speed mechanism includes a third transmission mechanism for producing the standard speed, a fourth transmission mechanism for producing a low speed, and a second swtiching means for selecting between the third and fourth transmission mechanisms. The first and third transmission mechanisms in combination produce a speed mode in which the front and rear wheels are driven at the same speed. The first and fourth transmission mechanisms in combination producing a low speed mode in which the front wheels are accelerated. The second and third transmission mechanisms in combination produce a high speed mode in which the front wheels are accelerated. The control means controls the first and second switching means to select the first and third transmission mechanisms when a steering angle of the front wheels exceeds a predetermined angle and the propelling drive transmission means is in a low speed position, to select the first and fourth transmission mechanisms when the steering angle of the front wheels exceeds the predetermined angle and the propelling drive transmission means is in a high speed position, and to select the first and second transmission mechanisms when the steering angle of the front wheels is below the predetermined angle.

This construction is similar to the foregoing construction in that the front wheel speed is increased over the rear wheel speed. This preferred embodiment is an example construction for realizing an improved capability of making a small turn efficiently while securing the safety of running, by varying object to be accelerated or decelerated (namely, the front and rear wheels in this example) in accordance with actual traveling speeds of the vehicle.

Other objects and advantages of the present invention will be apparent from the following description.

DESCRIPTION OF THE PREFERRED EMBODIMENT

Figure 1:
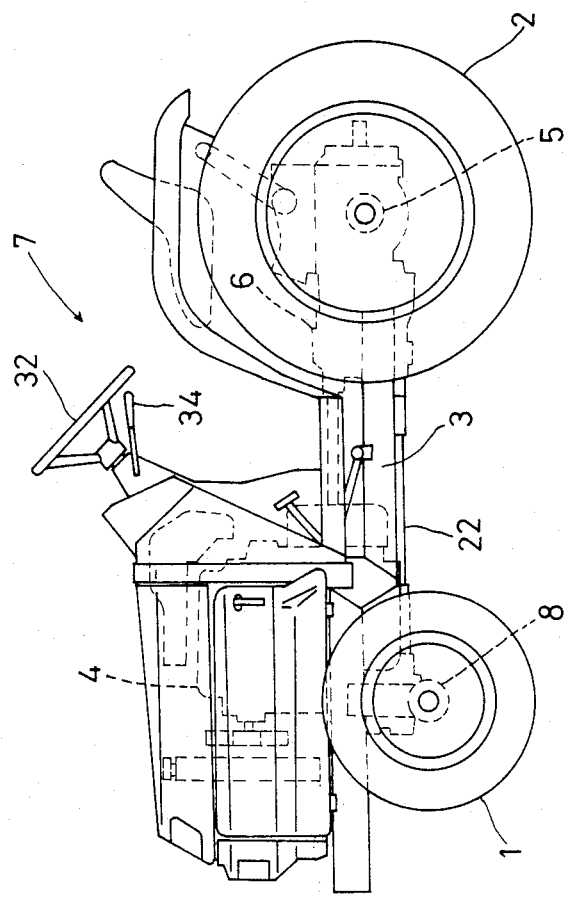
FIG. 1 is a side elevation of a four wheel drive tractor which is an example of four wheel drive working vehicle embodying the present invention.

As shown in FIG. 1, a four wheel drive agricultural tractor comprises a chassis 3 having dirigible front wheels 1 and rear wheels 2, an engine 4 mounted on a front portion of the chassis 3, and a transmission case 6 disposed rearwardly of a driver's section 7 and including a rear differential 5. A front wheel drive shaft 22 extends forwardly from the transmission case 6 to a front differential 8.

Figure 2:
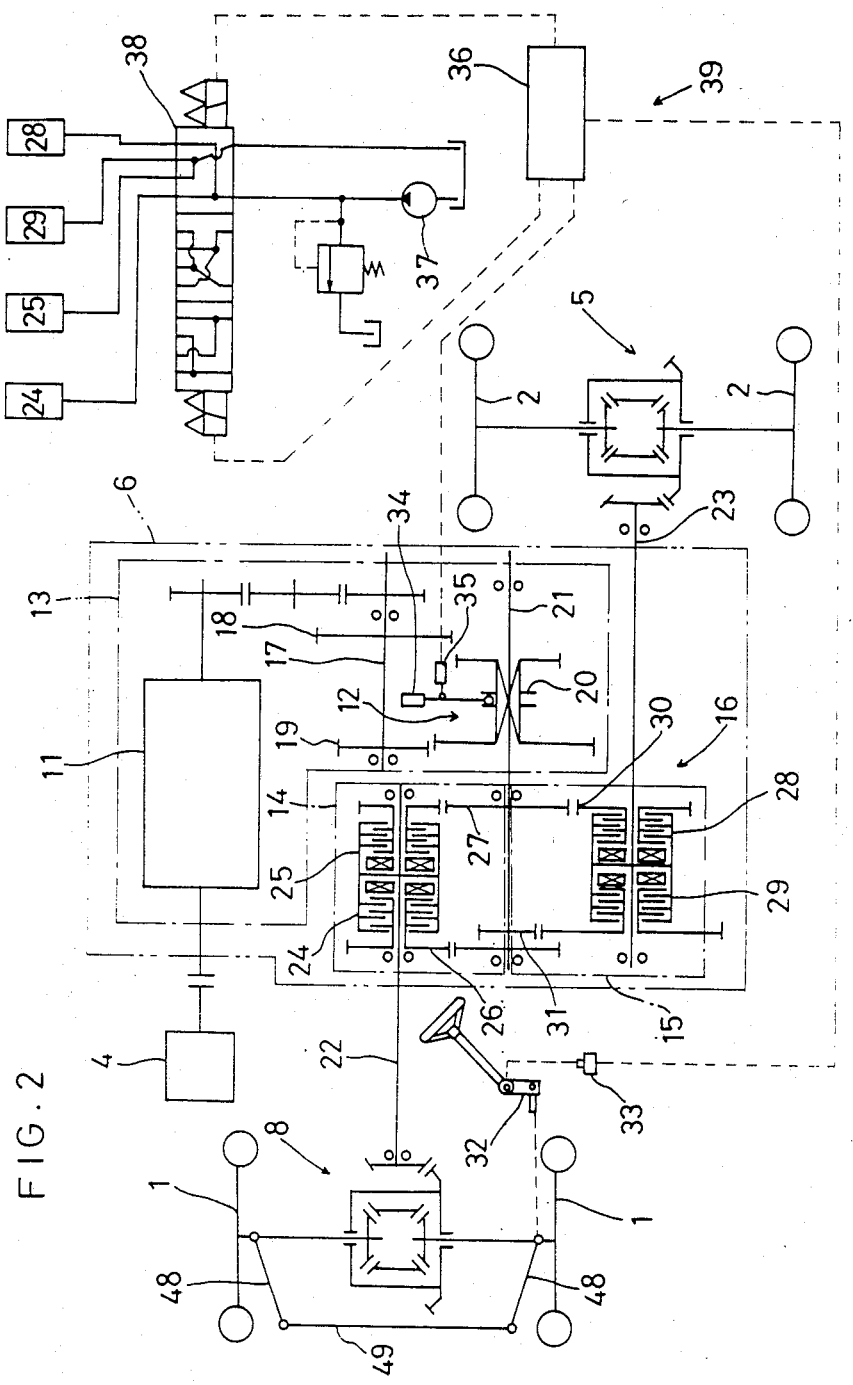
FIG. 2 is a diagram showing a propelling drive transmission system of the four wheel drive tractor.

A propelling drive transmission system according to the present invention will be described next centering on a front and rear wheel change speed device 16 mounted in the transmission case 6. As shown in FIG. 2, the drive of engine 4 input to the transmission case 6 is transmitted to the front and rear wheels 1, 2 through a propelling drive transmission 13 including a main change speed mechanism 11 and an auxiliary change speed mechanism 12 and through the front and rear wheel change speed device 16 including a front wheel change speed mechanism 14 and a rear wheel change speed mechanism 15 to be described later. More specifically, the main change speed mechanism 11 transmits the drive to a first transmission shaft 17 carrying two, large and small gears 18 and 19 fixed thereto. A second transmission shaft 21 is disposed parallel to the first transmission shaft 17. The second transmission shaft 21 carries a shift gear 20 splined thereto and constituting the auxiliary change speed mechanism 12 for providing two, high and low speeds. The front wheel drive shaft 22 extending to the front differenetial 8 and a rear wheel drive shaft 23 extending to the rear differential 5 are disposed parallel to the second transmission shaft 21. The front wheel drive shaft 22 carries a first switching device including an oil clutch 24 for transmitting the drive in a standard speed to the front wheels and an oil clutch 25 for transmitting the drive in a high speed to the front wheels. The second transmission shaft 21 is connected to the front wheel drive shaft 22 through a first transmission gearing 26 acting as means to provide the standard speed and a second transmission gearing 27 acting as means to provide the high speed, whereby the output of the propelling drive transmission 13 is transmitted to the front differential 8 through the oil clutches 24 and 25. The rear wheel drive shaft 23 carries a second switching device including an oil clutch 28 for transmitting the drive in the standard speed to the rear wheels and an oil clutch 29 for transmitting the drive in a low speed to the rear wheels.

The second transmission shaft 21 is connected to the rear wheel drive shaft 23 through a third transmission gearing 30 acting as means to provide the standard speed and a fourth transmission gearing 31 acting as means to provide the low speed, whereby the output of the propelling drive transmission 13 is transmitted to the rear differential 5 through the oil clutches 28 and 29. The oil clutch 24 for setting the front wheels to the standard speed, the oil clutch 25 for setting the front wheels to the high speed, the first transmission gearing 26 and the second transmission gearing 27 are collectively called herein the front wheel change speed mechanism 14 for changing the drive to the high speed for transmission to the front wheels 1. The oil clutch 28 for setting the rear wheels to the standard speed, the oil clutch 29 for setting the rear wheels to the low speed, the third transmission gearing 30 and the second transmission gearing 31 are collectively called herein the rear wheel change speed mechanism 15 for changing the drive to the low speed for transmission to the rear wheels 2.

A system for operating the front and rear wheel change speed mechanisms 14 and 15 will be described hereinafter.

An angle sensor 33 such as a potentiometer in provided on a pivotal axis of a pitman arm 32 linked to a steering wheel in the driver's section 7, for indirectly detecting steering angles of the dirigible front wheels 1. A limit switch 35 is provided to act as a position sensor for detecting positions of a control lever 34 associated with the auxiliary change speed mechanism 12. The sensor 33 and limit switch 35 output detection results to a control unit 36 which controls, by means of a three-position electromagnetic valve 38, pressure oil flows from a pump 37 to the oil clutches 24, 25, 28 and 29. These sensors 33 and 35, control unit 36 and electromagnetic valve 38 are collectively called herein a control device 39 which links the front and rear wheel change speed device 16 to the steering system.

The first and second switching devices or oil clutches 24, 25, 28 and 29 are controllable according to traveling states as follows. When the steering angle of front wheels is below a predetermined angle (for example, 40 degrees), the oil clutches 24 and 28 are engaged thereby to maintain the front and rear wheels in the standard speed. When the tractor makes a turn from this state and the steering angle of front wheels exceeds the predetermined angle, and if the auxiliary change speed mechanism 12 is in a high speed position at this time, the oil clutch 24 and oil clutch 29 are engaged thereby to maintain the front wheels 1 in the standard speed and switch the rear wheels 2 to the low speed for allowing the tractor to make a small, sharp turn. If the auxiliary change speed mechanism 12 is in a low speed position at this time, the oil clutch 25 and oil clutch 28 are engaged thereby to maintain the rear wheels 2 in the standard speed and switch the front wheels 1 to the high speed for allowing the tractor to make small, sharp turn.

Thus, when the tractor travels slowly for carrying out an agricultural operation, the control device accelerates the front wheels to enable the tractor to make a small, sharp turn. Since the traveling speed which constitutes the basic speed is slow, the acceleration does not result in the danger of overturning but allows for a speedy turn thereby to shorten a non-operative time necessary for making a turn at a boundary. When the tractor travels on a road at high speed, the basic speed is high and therefore the rear wheels is decelerated to allow for a small, sharp turn while avoiding the danger of overturning.

The change speed ratio for the high and low speeds of the front and rear wheel change speed mechanisms 14 and 15 is from 1:2 to 1:3 with respect to the standard speed.

Figure 3:
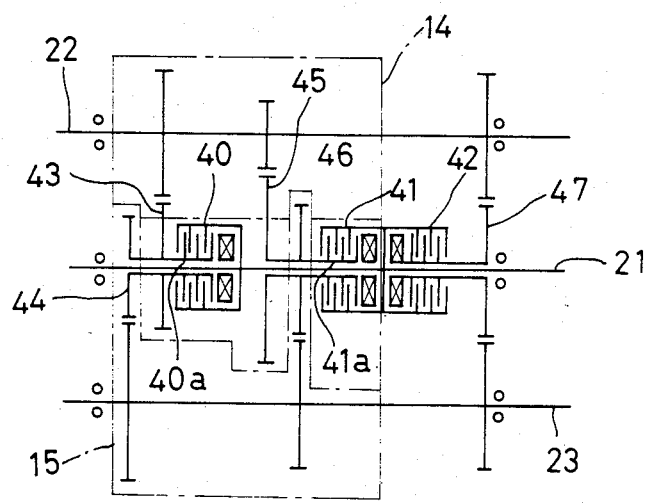
FIG. 3 is a schematic view of a modified front and rear wheel change speed mechanism.

A modified form of the change speed device 16 will be described with reference to FIG. 3. In this example, the second transmission shaft 21 carries a first oil clutch 40, a second oil clutch 41 and a third oil clutch 42. A front wheel change speed mechanism 14 and a rear wheel change speed mechanism 15 are provided between the second transmission shaft 21 and the front wheel drive shaft 22 and rear wheel drive shaft 23.

More particularly, the first oil clutch 40 includes an output member 40a having a large gear 43 for outputting the drive to the front wheel drive shaft 22 and a small gear 44 for outputting the drive to the rear wheel drive shaft 23. These elements constitute the rear wheel change speed mechanism 15 for transmitting the drive in the low speed to the rear wheel drive shaft 23. The second oil clutch 41 includes an output member 41a having a large gear 45 for outputting the drive to the front wheel drive shaft 22 and a small gear 46 for outputting the drive to the rear wheel drive shaft 23. These elements constitute the front wheel change speed mechanism 14 for transmitting the drive in the high speed to the front wheel drive shaft 22. The third oil clutch 42 includes an output member 42a having a single gear 47 for outputting the drive to the front wheel drive shaft 22 and rear wheel drive shaft 23. These elements constitute part of the propelling drive transmission 13 for transmitting the drive in the standard speed to the two drive shafts 22 and 23.

Figure 4:
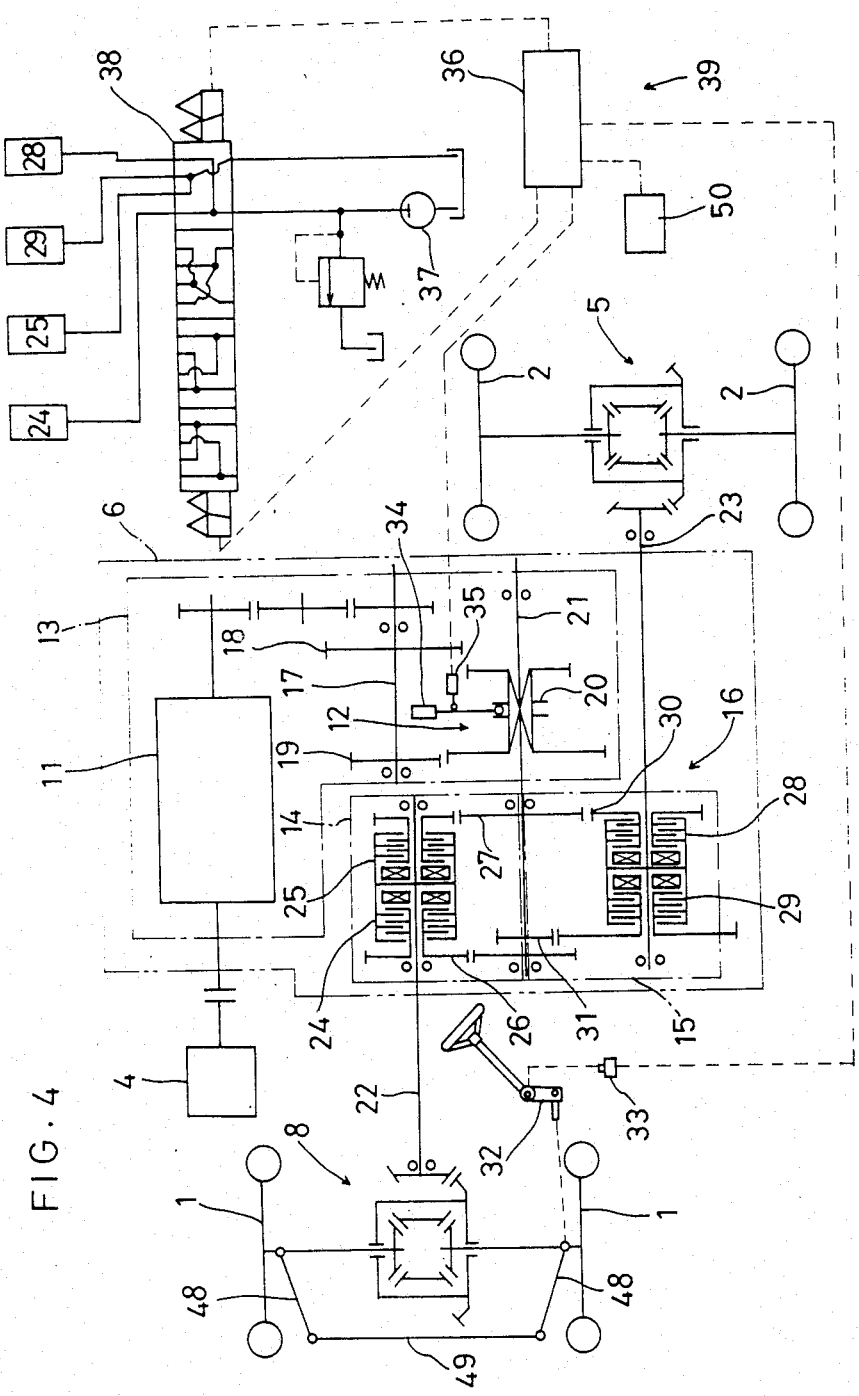
FIG. 4 is a diagram showing a propelling drive transmission system according to a further embodiment.

A propelling drive transmission system shown in FIG. 4 will be described next. This system is a modification of the system shown in FIG. 2 and is different from the latter in that an electromagnetic valve 38' has four positions and that a control device 39' further includes a sharp turn permitting switch 50. The components of this system affixed with the same references as in the preceding system have the same functions and their description will not be repeated.

When in a first position, the electromagnetic valve 38' actuates the first transmission gearing 26 and the third transmission gearing 30 to drive the front and rear wheels in the standard speed. When in a second position, the electromagnetic valve 38' actuates the first transmission gearing 26 and the fourth transmission gearing 31 to accelerate the front wheels during a low speed traveling of the tractor. When in a third position, the electromagnetic valve 38' actuates the second transmission gearing 27 and the third transmission gearing 30 to accelerate the front wheels during a high speed traveling of the tractor. When in a fourth position, the electromagnetic valve 38' actuates the second transmission gearing 27 and the fourth transmission gearing 31 to accelerate the front wheels for a sharp turn.

In accordance with positions of the sharp turn permitting switch as well as change speed positions of the propelling drive transmission and steering positions of the front wheels, the control unit 36 controls the first and second switching devices of the front and rear wheel change speed device 16 through the electromagnetic valve 38' in the following four modes:

(1) The first and second switching devices are controlled to select the second transmission gearing and the third transmission gearing when the steering angle of the front wheels exceeds the predetermined angle and the propelling drive transmission is in a low speed position, (2) The first and second switching devices are controlled to select the second transmission gearing and the fourth transmission gearing when the steering angle of the front wheels exceeds the predetermined angle and the propelling drive transmission is in a high speed position, (3) The first and second switching devices are controlled to select the first transmission gearing and the third transmission gearing when the steering angle of the front wheels is below the predetermined angle, and (4) The first and second switching devices are controlled to select the second transmission gearing and the fourth transmission gearing only when the steering angle of the front wheels exceeds the predetermined angle and the sharp turn permitting switch is turned on.

In this embodiment, as in the first embodiment, the high speed and low speed positions of the auxiliary change speed mechanism is used as reference for the change speed positions the propelling drive transmission.

This embodiment can utilize the combination of the second transmission gearing 27 and the fourth transmission gearing 31 which is not possible with the first embodiment. This combination results in a maximum speed difference between the front and rear wheels, and may be dangerous if used improperly. The sharp turn permitting switch 50 is provided to prevent this combination from becoming operative inadvertently. In other words, this combination is possible only when the sharp turn permitting switch 50 is turned on. The sharp turn permitting switch 50 normally is in an OFF state.

What is claimed is:

1. A four wheel drive vehicle comprising:
an engine,
front wheels and rear wheels driven by said engine, said front wheels being dirigible,
propelling drive transmission means for producing at least two, high and low, speeds,
a front wheel change speed mechanism for receiving power from said propelling drive transmission means and producing a plurality of speeds, said front wheel change speed mechanism including a first switching means for selecting between the plurality of speed to be produced by said front wheel change speed mechanism,
a rear wheel change speed mechanism for receiving power from said propelling drive transmission means and producing a plurality of speeds, said rear wheel change speed. mechanism including a second switching means for selecting between the plurality of speeds to be produced by said rear wheel change speed mechanism, and
control means for controlling said first and second switching means, said control means receiving information regarding change speed positions of said propelling drive transmission means and steering positions of said front wheels,
wherein said control means is operable in response to the change speed positions of said propelling drive transmission means to control said first and second switching means to select a speed mode in which said front wheels are driven faster than said rear wheels when a steering angle of said front wheels exceeds a predetermined angle, and to select a speed mode in which said front wheels and said rear wheels are driven at substantially the same speed when the steering angle of said front wheels is below said predetermined angle.

2. A four wheel drive vehicle as claimed in claim 1 wherein the speed selectively produced by said front wheel change speed mechanism when the steering angle of said front wheels exceeds said predetermined angle and said propelling drive transmission means is in a high speed position results in a lower rotational rate than a speed selected when said propelling drive transmission means is in a low speed position, and the speed selectively produced by said rear wheel change speed mechanism when the steering angle of said front wheels exceeds said predetermined angle and said propelling drive transmission means is in the low speed position results in a lower rotational rate than a speed selected when said propelling drive transmission means is in the high speed position.

3. A four wheel drive vehicle comprising;
an engine,
front wheels and rear wheels driven by said engine, said front wheels being dirigible,
propelling drive transmission means for producing at least two, high and low, speeds,
a front wheel change speed mechanism for receiving power from said propelling drive transmission means, said front wheel change speed mechanism including a first transmission mechanism for producing a standard speed, a second transmission mechanism for producing a high speed, and a first switching means for selecting between said first and second transmission mechanisms,
a rear wheel change speed mechanism for receiving power from said propelling drive transmission means, said rear wheel change speed mechanism including a third transmission mechanism for producing the standard speed, a fourth transmission mechanism for producing a low speed, and a second switching means for selecting between said third and fourth transmission mechanisms,
said first and third transmission mechanisms in combination producing a speed mode in which said front and rear wheels are driven at the same speed, said first and fourth transmission mechanisms in combination producing a low speed mode in which said front wheels are accelerated, and said second and third transmission mechanisms in combination producing a high speed mode in which said front wheels are accelerated, and
control means for controlling said first and second switching means, said control means receiving information regarding change speed positions of said propelling drive transmission means and steering positions of said front wheels,
wherein said control means controls said first and second switching means to select said first and third transmission mechanisms when a steering angle of said front wheels exceeds a predetermined angle and said propelling drive transmission means is in a low speed position, to select said first and fourth transmission mechanisms when the steering angle of said front wheels exceeds said predetermined angle and said propelling drive transmission means is in a high speed position, and to select said first and second transmission mechanisms when the steering angle of said front wheels is below said predetermined angle.

4. A four wheel drive vehicle as claimed in claim 3 wherein said first and second switching means comprise oil clutches, and said control means comprises input means including an angle sensor for detecting the steering angle of said front wheels and a position sensor for detecting the change speed position of said propelling drive transmission means, output means including a control valve for controlling said oil clutches, and signal processing means for processing signals received from said input means and transmitting control signals to said output means.

5. A four wheel drive vehicle as claimed in claim 4 wherein each of said first to fourth transmission mechanisms comprises a transmission gearing.

6. A four wheel drive vehicle as claimed in claim 5 wherein said propelling drive transmission means includes a main transmission for providing a plurality of speeds and an auxiliary transmission for providing two, high and low, speeds, said position sensor being operable to detect change speed positions of said auxiliary transmission.

7. A four wheel drive vehicle comprising;
an engine,
front wheels and rear wheels driven by said engine, said front wheels being dirigible,
propelling drive transmission means for producing at least two, high and low, speeds,
a front wheel change speed mechanism for receiving power from said propelling drive transmission means, said front wheel change speed mechanism including a first transmission mechanism for producing a standard speed, a second transmission mechanism for producing a high speed, and a first switching means for selecting between said first and second transmission mechanisms,
a rear wheel change speed mechanism for receiving power from said propelling drive transmission means, said rear wheel change speed mechanism including a third transmission mechanism for producing the standard speed, a fourth transmission mechanism for producing a low speed, and a second switching means for selecting between said third and fourth transmission mechanisms,
said first and third transmission mechanisms in combination producing a speed mode in which said front and rear wheels are driven at the same speed, said first and fourth transmission mechanisms in combination producing a low speed mode in which said front wheels are accelerated, said second and third transmission mechanisms in combination producing a high speed mode in which said front wheels are accelerated, and said second and fourth transmission mechanisms in combination producing a sharp turn mode in which said front wheels are accelerated,
a sharp turn permitting switch, and
control means for controlling said first and second switching means, said control means receiving information regarding change speed positions of said propelling drive transmission means, steering positions of said front wheels, and positions of said sharp turn permitting switch,
wherein said control means controls said first and second switching means to select said first and third transmission mechanisms when a steering angle of said front wheels exceeds a predetermined angle and said propelling drive transmission means is in a low speed position, to select said first and fourth transmission mechanisms when the steering angle of said front wheels exceeds said predetermined angle and said propelling drive transmission means is in a high speed position, to select said first and second transmission mechanisms when the steering angle of said front wheels is below said predetermined angle, and to select said second and fourth transmission mechanisms only when said sharp turn permitting switch is in an ON position and the steering angle of said front wheels exceeds said predetermined angle.

* * * * *